United States Patent
Malkin et al.

(10) Patent No.: US 10,275,727 B2
(45) Date of Patent: Apr. 30, 2019

(54) DYNAMIC LOCATION-AWARE COORDINATION METHOD AND SYSTEM

(75) Inventors: Peter K. Malkin, Ardsley, NY (US); Jacquelyn A. Martino, Cold Spring, NY (US); Louis J. Percello, Armonk, NY (US)

(73) Assignee: International Business Machines Corporation, Armonk, NY (US)

( * ) Notice: Subject to any disclaimer, the term of this patent is extended or adjusted under 35 U.S.C. 154(b) by 996 days.

(21) Appl. No.: 13/450,093

(22) Filed: Apr. 18, 2012

(65) Prior Publication Data

US 2013/0283211 A1      Oct. 24, 2013

(51) Int. Cl.
  *G06F 3/048*      (2013.01)
  *G06Q 10/06*      (2012.01)

(52) U.S. Cl.
  CPC .................................. *G06Q 10/06* (2013.01)

(58) Field of Classification Search
  CPC ............ G06F 3/00; G06F 3/048; G06Q 10/06
  USPC ................................. 715/844; 705/7.12–7.18
  See application file for complete search history.

(56) References Cited

U.S. PATENT DOCUMENTS

| | | | | |
|---|---|---|---|---|
| 5,111,391 A * | 5/1992 | Fields | ..................... | G06Q 10/06 705/7.14 |
| 5,890,134 A * | 3/1999 | Fox | ........................ | G06Q 10/06 700/100 |
| 5,899,979 A * | 5/1999 | Miller et al. | ................. | 705/7.21 |
| 6,263,358 B1 * | 7/2001 | Lee | ....................... | G06F 9/4881 718/100 |
| 6,898,569 B1 * | 5/2005 | Bansal et al. | ................ | 705/7.16 |
| 7,502,747 B1 * | 3/2009 | Pardo | ..................... | G06Q 10/06 705/7.13 |
| 7,809,360 B2 | 10/2010 | Agrawal et al. | | |
| 8,311,865 B2 * | 11/2012 | Vogel et al. | ................. | 705/7.12 |
| 8,341,004 B2 * | 12/2012 | Daughtrey et al. | .......... | 705/7.18 |
| 8,510,737 B2 * | 8/2013 | Kunjithapatham | ... | G06F 9/4843 340/12.22 |
| 8,522,240 B1 * | 8/2013 | Merwarth | .......... | G06Q 10/0631 705/26.82 |
| 8,555,281 B1 * | 10/2013 | van Dijk | .............. | G06F 9/4881 718/100 |

(Continued)

FOREIGN PATENT DOCUMENTS

JP      2002159044      5/2002

OTHER PUBLICATIONS http://www.gpstodolist.com/, "Multitasking comes to GPS ToDo List, at last . . . ", Printed Oct. 11, 2011.

(Continued)

*Primary Examiner* — Sang H Kim
(74) *Attorney, Agent, or Firm* — Scully, Scott, Murphy & Presser, P.C.; Daniel Morris, Esq.

(57) ABSTRACT

A system, method and computer program product for automatically providing a dynamically updated optimized itinerary (continuous optimization in real-time) which allows one to complete a specified task and also to complete other tasks from a to-do list, providing the user both with a packing list of resources to carry and a list of tasks that must be completed before leaving. The system and method also tracks the time and user's location to provide user with a new itinerary in the event a given task cannot be completed successfully. The method also provides an alert in case no practicable itinerary exists.

23 Claims, 8 Drawing Sheets

(56) References Cited

U.S. PATENT DOCUMENTS

| | | | |
|---|---|---|---|
| 2002/0082771 A1* | 6/2002 | Anderson | G01C 21/3484 701/423 |
| 2004/0261013 A1* | 12/2004 | Wynn et al. | 715/511 |
| 2007/0015495 A1* | 1/2007 | Winter | G08G 1/205 455/414.1 |
| 2008/0046298 A1* | 2/2008 | Ben-Yehuda | G06Q 10/025 705/6 |
| 2009/0113428 A1* | 4/2009 | Huff et al. | 718/100 |
| 2009/0177513 A1 | 7/2009 | Eckhart et al. | |
| 2009/0199192 A1* | 8/2009 | Laithwaite | G06Q 10/06 718/104 |
| 2009/0210143 A1* | 8/2009 | Seltzer | G01C 21/28 701/532 |
| 2009/0254269 A1 | 10/2009 | Borrillo et al. | |
| 2010/0077400 A1* | 3/2010 | Ioannou | G06Q 10/02 718/104 |
| 2010/0153001 A1 | 6/2010 | Bauchot et al. | |
| 2010/0204911 A1* | 8/2010 | Taguchi | B60W 10/06 701/532 |
| 2011/0071893 A1* | 3/2011 | Malhotra et al. | 705/14.23 |
| 2011/0112881 A1 | 5/2011 | Malhotra et al. | |
| 2011/0161271 A1* | 6/2011 | Purang et al. | 706/46 |
| 2012/0089322 A1* | 4/2012 | Horvitz | G01C 21/3492 701/400 |
| 2016/0148170 A1* | 5/2016 | Fitzpatrick | G06Q 10/1097 705/7.21 |

OTHER PUBLICATIONS

IBM, "Self Managing Recurring ToDos and Events", IP.com No. IPCOM000175051D, Original Publication Date: Oct. 3, 2008.

IBM, "System and Method for conditional task prioritization and proactive recommendations for tasks from shared to-do lists", IP.com No. IPCOM000188277D, Original Publication Date: Sep. 29, 2009.

Wikipedia, "Travelling salesman Problem", last modified Mar. 31, 2012.

* cited by examiner

| Task Name | Job Priority | Date/Time Needed- Latest End Time | Duration Of Task Range | Start Time Latest | Location Position | Price | Quality | State Before | State After | Skill set requirement | Required Resources |
|---|---|---|---|---|---|---|---|---|---|---|---|
| Talk to customer in Boston | 1 | 1/1/14 | 1 hour | 3:00PM | Boston, MA | N/A | N/A | in NY | in Boston | | Projector & extension chord |
| Return book to colleague | 2 | N/A | ½ hour | 4:00PM | Boston, MA | N/A | | | in Boston, MA | N/A | Book to be returned |
| Build Dog House | 3 | | 6 hours | | Hamden, CT | $200 | | | in Hamden, CT | | Hammer |
| Give talk at meeting in Boston | | | | | | | | | | | |

FIG. 2

| | | | | |
|---|---|---|---|---|
| | | 202 | 204 | 206 | 208 |
| | Hammer Available | Store 1 Location, Hours, Price, etc. | Store 2 Location, Hours, Price, etc. | Store 3 Location, Hours, Price, etc. |
| 203 | Alternatives To Hammer | | | |
| 205 | Carpenters | Carpenter 1: Location, Hours, Price, skill set availability 207a | Carpenter 2: Location, Hours, Price, skill set availability 207b | |
| 211 | Distance Calculation From node 1 to node 2 | | | |
| 215 | Weather conditions | | | |
| 219 | Road, Traffic, conditions | | | |

DYNAMIC LOCATION-AWARE COORDINATION METHOD AND SYSTEM

BACKGROUND

This disclosure relates generally to devices and systems for dynamic itinerary planning and tracking for mobile communications devices, and particularly to a system and method for optimizing dynamically updated itineraries for users.

BACKGROUND OF THE INVENTION

Systems and methods for dynamic itinerary planning for mobile communication devices employ functions for receiving information from users and generating an itinerary employed for real-time running. In such systems, a current time and location are considered for the mobile communications device to determine if the next scheduled itinerary event on an item "to-do" list can be maintained in time. If not, a user is prompted to edit the itinerary or it can be done automatically. If the user is on schedule, an alert is issued, advising the user of the next event.

Further, systems and methods exist that automatically retrieve event information and calculate an itinerary based on both the locations of the events and the time windows associated with the events. If the itinerary calculator receives an updated physical location as the mobile device is moved, the itinerary calculator can calculate updated directions.

Further systems and methods exist that implements functions for alerting a user of an item on a "to-do" list if the user is detected to be close to the item's performance location. A to-do list may be shared by multiple terminals and notifications and status flags for the to-do list item are shared among the multiple terminals to update the to-do list.

Further electronic task management systems and methods exist that provides solicitation for offers, from third party providers and/or task management system users, for review and acceptance by a task management system user for the user's inclusion into a to-do list task item within a task management system calendar. A new to-do list task item includes a to-do list task item alert in accordance with user preferences; the new to-do list task item modifiable by the task management system with third party provider updates.

Further methods/apparatuses exist for facilitating a location-based, distributed to-do-list that relates to task management systems and more specifically, for facilitating a location based, distributed to-do list. The method involves receiving a status update at a task management system, and sending a task to an assignee when a location of the assignee matches a location for that task.

None of these solutions automatically provides a dynamically updated optimized itinerary for one or more users that compensates for real-time dynamics.

SUMMARY

A system, method and computer program product for providing a dynamically updated optimized itinerary for one or more users that compensates for real-time dynamics.

The system, method and computer program product allows users to complete a specified task, but also enables them to complete other tasks from a list of to-dos, providing the user both with a packing list of resources they must take with them as well as a list of tasks they must complete before leaving.

The system, method and computer program product tracks the time and the user's location, providing them with a new itinerary in the event a given itinerary step cannot be successfully complete. An alert may further be provided in case no practicable itinerary exists (i.e., where no combination of actions will successfully achieve the specified task).

The system, method and computer program product calculates a packing list of resources needed to run the itinerary, or a list of pre-flight tasks; and, further, signals the failure case, i.e. when there is no practicable itinerary for the specified tasks/to-dos.

The system, method and computer program product further calculates a packing list of resources needed to run the itinerary, or a list of pre-flight tasks; and, calculates required resources to run the itinerary such as a person with particular skills or of a particular role and attempts to arrange for a person with the required characteristics to be available at the target location at (or during) the target time. The failure case is also signaled to a user, i.e. when there is no practicable itinerary for the specified tasks/to-dos.

The system, method and computer program product optimizes itinerary based on tasks on a to-do list. If a task is not doable, the system will modify the itinerary. The system, method and computer program product also signals the failure case, i.e. when there is no practicable itinerary for the specified tasks.

The system, method and computer program product ensures that required resources are available when a task is to be performed by either including it in the user's packing list (i.e., those things the user arranges to take with her before leaving) or schedules the required resource (e.g., arranging for a required electrician to be present when (or before) the user arrives); and, while also signaling the failure case, i.e. when there is no practicable itinerary for the specified tasks/to-dos.

In one aspect, the current disclosure includes a system and method that assigns a task to one or more user(s) before the assignee(s) arrives at a location.

BRIEF DESCRIPTION OF THE DRAWINGS

These and other objects, features and advantages of the present invention will become apparent from the following detailed description of illustrative embodiments thereof, which is to be read in connection with the accompanying drawings, in which:

FIG. 2 depicts an example user to-do list in the form of a database table 100 that includes example Task Requirements (e.g., resource information) employed by optimization logic in one embodiment;

FIG. 3 depicts an example Constraints Requirements information table 200 employed by optimization logic in one embodiment;

DETAILED DESCRIPTION

A system, method and computer program product automatically provides a dynamically updated optimized itinerary for one or more users that compensates for real-time dynamics.

Moreover, the system and method providing a dynamically updated optimized itinerary for users not only allows a user(s) to complete a specified task, but also enables them to complete other tasks from a list(s) of to-dos, providing the user(s) both with a "packing" list of resources they must take with them as well as a list of tasks they must complete before leaving. The system/method employs location-based tracking functionality for tracking the current time and user(s)'s current location, and implements optimization logic (i.e., logic performing method steps in FIG. 7) that includes providing user's with a new itinerary in the event a given itinerary step cannot be successfully completed. The system/method can also provide an alert in case no practicable itinerary exists (i.e., where no combination of actions will successfully achieve a specified task).

Figure 1:
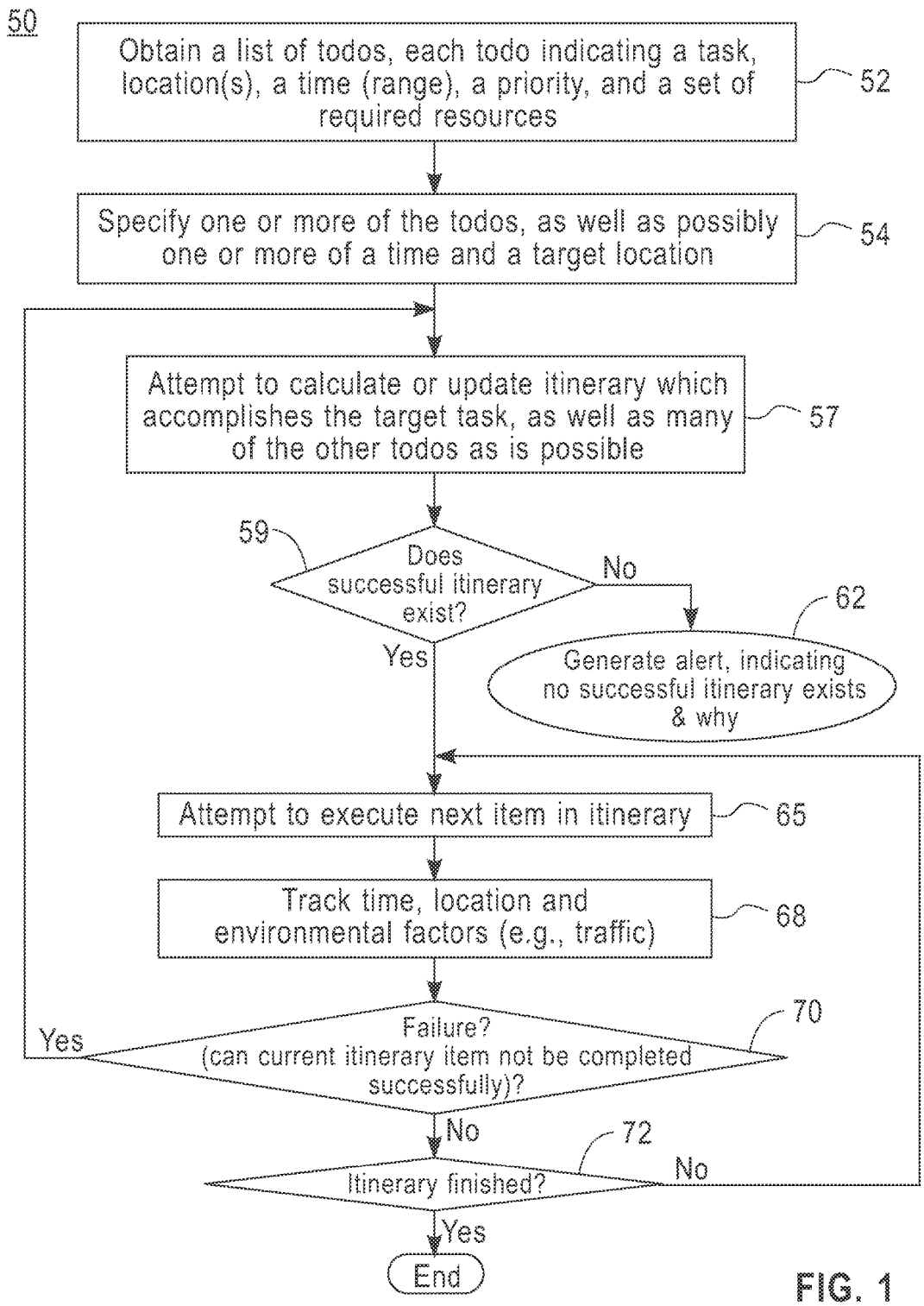
FIG. 1 depicts a detailed overview of a "to-do" list item generation and processing method 100 employing optimization logic for automatically providing a dynamically updated optimized itinerary for the user in one embodiment.

FIG. 1 shows a "to-do" list item generation and processing method 50 employing logic, as will be described in greater detail herein below, for automatically providing a dynamically optimized itinerary for the user. In the computer system's memory storage device, e.g., a database, there is received or stored one or more user's to-do list(s). As shown in FIG. 1, when setting up a given itinerary (e.g., starting an itinerary for a trip and/or a set of tasks for the user to perform), the list of to-dos or task(s) are input to or automatically retrieved by a computer system, e.g., a database server device, as indicated at 52. In one example, as shown at 52, each "to-do" may include one or more criteria for setting up and generating an itinerary for a user, including, but not limited to: a task(s)(e.g., present product to a customer); one or more target location(s) where task can be accomplished (e.g., Boston, Mass. or Boise, Id.); a time (range) required to complete task (e.g., 1-2 hours); a priority indicating importance for performing the task (e.g., 1 through 10, 1 being the most important); and, any required resources for performing the task(s) (e.g., laptop and projector).

In FIG. 1, at 54, there is represented the action of specifying one or more of the "to-dos" including further criteria for setting up or dynamically updating an itinerary for a user, for example, time and a target location. Additionally, the user determines constraints to perform the one or more "to-dos." The user, or a server device maintaining the "to-do" list for the user, generates a table (e.g., table 200 in FIG. 3) that specifies the constraints, e.g., based on entries of a corresponding user constraint and required resource table 200, such as a required resource or item for performing a task (e.g., a "hammer") with further indications in the constraint and required resource table 200 as to locations where the required resource (e.g., a hammer) is available for purchase and/or prices of the hammer, etc.

In one embodiment, shown in FIG. 3, via a display interface on a user's device, the user can manually enter one or more constraints, e.g., a required tool such as a "hammer" 202, into the system. In one embodiment, the table 200 is generated as shown in FIG. 3. Then, a client device (e.g., mobile phone device, smartphone, Voice over Internet Protocol (VoIP) phone devices, or a computing device, etc.) of the user may communicate a query, e.g., via communications modality such as text or voice, etc., to a service, e.g., embodied as a server device or a website, associated with a retailer or store that is nearby the current location of the user. The query submitted requests any locations, prices, store hours of stores that carry that required resource, e.g., "hammer." Then, the on-line retail service, or the retailer's server device may provide information including, but not limited to: locations, prices, store hours of available stores that carry that required resource, e.g., "hammer" A user's client device may display this information to the user as shown in FIG. 3 and may provide this information to the database server device (e.g., a computer 800 shown in FIG. 8) maintaining the user's one or more "to-dos." In one embodiment, the database server device pre-processes this information before running or re-running an algorithm, e.g., the traveling salesman algorithm, to calculate an itinerary. The "Traveling salesman" algorithm refers to a process applied to a given a weighted graph. That algorithm outputs a path to visit all the vertices in the graph with the least amount of cost. (see, for e.g., http://en.wikipedia.org/wiki/Travelling_salesman_problem) Pre-processing of this information includes, but is not limited to: determining a distance between a current location of the user and a location that can satisfy a constraint, determining a price to satisfy the constraint (e.g., the price of the hammer, the fuel consumed to arrive at a store to obtain the hammer, etc.), and determining a time duration needed to satisfy the constraint (e.g., a time duration to arrive the store, a time duration from the store to a target location for a task). A constraint includes, but is not limited to: purchasing an item before performing a task.

FIG. 3 depicts an example constraints requirements database table 200 stored in a memory storage device associated with and accessed by the database server device. The task constraints (e.g., physical, temporal, etc.) in Table 200 may be continually updated either by the user, or automatically, via monitoring such as by a satellite-based location tracking (e.g., GPS) for tracking user location. In FIG. 3, the database table 200 depicted is associated with a single task, and may include a column 202 for listing a particular resource needed to perform the task, e.g., an item such as a hammer, or an alternative item 203. Besides specifying the item, the database server device is configured to obtain real time information, e.g., from one or more on-line retail sources, as to how that item may be acquired, e.g., purchased at a store, prior to performing the task, e.g., by indicating attributes such as one or more store location(s), hours of store operations, prices for purchasing the item, travel distances to/from store locations and from target locations, etc., as constraints entered in columns 204, 206, 208.

Besides the requirement for the particular item, a to-do task may require a particular participant 205, e.g., a carpenter, with a particular skill set, to be at the location and use the item. Thus, in one embodiment, the database server device, via network communications, accesses web-based information to determine the availability of the particular participant, e.g., carpenters having their respective particular skill sets 207a, 207b, etc. and further populates the constraint and required resource table 200. Example constraints 207a, 207b for each potential participant entered into Table 200 may include attributes such as a Location, Hours, Price, skill set, availability information of each participant (e.g., carpenter) that is required to be present at the particular task. A further constraint includes a distance calculation 211, for example, representing a travel distance for the user or participant to travel between a current user location, i.e., a node 1, to the location of the current task, i.e., a node 2, or a distance or time of going off-route and whether there is more time, risk (weather/traffic) due to re-route. Given current conditions, this constraint is provided and used for pre-processing. Additionally input to Table 200 includes current weather condition information 215 and road traffic condition information 219, as obtained via real time information systems (e.g., real-time local news feeds). For example, constraint requirements table 200, may be dynamically updated, e.g., to a web server that broadcasts to mobile devices over a communications infrastructure. For example, an HTTP protocol-based communication interfaces compatible with RSS (Really Simple Syndication) and Atom (Atom Syndication Format) may be used by the software program to receive web feeds to check for updates published on a website.

In one embodiment, a constraint may include a to-do having one or more pre-requisites that need to be completed before performing an associated to-do. For example, in table 200 in FIG. 3, a node 202 for obtaining an available hammer and a node 205 for arranging an available carpenter should be completed before performing a to-do, e.g., building a dog house, etc. In this embodiment, the pre-requisite task may have higher priorities than their associated to-do. In such an embodiment, the database server device may schedule an itinerary that would include the user to perform the higher-priority "pre-requisite" tasks before starting to perform the associated to-do.

For example, an itinerary may be dynamically configured from a selection of user specified tasks to perform from one or more specified to-do lists, e.g., selected from categorized lists of to-dos, e.g., a work or business related to-do list, a personal or family related to-do list, etc. The specification of specific tasks may include specification of resources to bring, and a time and target location in which resource is to be available.

FIG. 2 depicts an example dynamic data structure, e.g., a database table 100, including a user to-do list stored in a memory storage device associated with and accessed by the database server device. Table 100 includes example Task Requirements (e.g., resources) that may be continually updated by the user, or updated in an automated fashion. As shown in FIG. 2, the database table 100 depicted includes a column 101 for listing the user task(s), e.g., get hammer, travel to Boston, build dog house, give presentation at meeting in Boston, etc. and, associated with each task 101, there is populated a respective series of columns providing user-entered related task-specific information including, but not limited to: a column 102 for indicating a Date/Time Needed-Latest End Time for performing the respective task; a column 103 for indicating a priority of a corresponding task; a column 104 for indicating a time duration for performing the task; a column 104 for indicating a duration for that task; a column 106 for indicating a latest start time for commencing the task; a column 108 indicating a location/position for performing the task; a column 110 indicating a price of a particular resource; a column 112 indicating a quality of a particular resource; a column 114 indicating a pre-condition that must be satisfied prior to performing a corresponding task; a column 116 indicating a subsequent state i.e., a state that results in after performing the corresponding task; a column 118 indicating any particular requirement or resource skill set for performing the task; and, a column 120 indicating any resource required to perform the task. Further fields may present that categorizing of to-do lists or prioritizing of them, e.g. selecting by category what (to-dos) is/are desired to be processed, e.g., work to-do, family to-do, "private" life to-do- and indicate a further field for indicating a priority (importance).

In a further aspect, the system, method and computer program product further ensures that required resources are available when a task is to be performed. That is, in coordination with generating an itinerary, the database server device employs functions for generating a resource or "packing" list for the user to include, bring or carry the correct items for performing a task(s) of a generated itinerary (e.g., arranges those items the user is to take before leaving for the trip or itinerary). For example, given a to-do list that includes a travel to Boston to perform a primary task, there may be further opportunity (as determined by the optimization logic) employed to perform a secondary task, e.g., user to build a dog house at first location, and/or attend a second meeting at another location. In one embodiment, this secondary task may require use of a specific resource, e.g., a tool, or the presence of a certain persons or individuals(s) with a specific skill set, for example, a carpenter. Further data and information manually or automatically stored into the database server device for processing by the database server device may include any constraints for accomplishing each of the to-do tasks of a user's itinerary.

Returning to FIG. 1, the database server device running the travelling salesman algorithm is configured to operate an itinerary generation program that implements methods to access each of the specified to-do lists, packing lists, and constraints, and calculate an itinerary list of to-do's and required resources. In one embodiment, at 57, based on one or more stored to-do lists 100, there is automatically attempted to calculate (or update) the itinerary which accomplishes the target task, as well as many of the other to-do's from the list as is possible. The itinerary generation program employs logic and functions for solving the "traveling salesman" algorithm however, modified as described herein, to provide dynamic updating and optimized itinerary solutions as described herein. For example, to run a travelling salesman algorithm, each target location for a task may be a vertex, i.e., a node, in a weighted graph. A traffic road(s) between two target locations may become an edge between two different vertices. A weight of each edge may be determined, e.g., based on a current time, a current location, a current weather condition, a current traffic condition, a priority of a next task, and a distance between two target locations.

In one embodiment, a weight of an edge between any two vertices is determined using the following formula (higher final values indicating greater weight or distance, which the traveling salesman algorithm strives to minimize):

---

Let:
    A be a starting location
    B be the destination location
    Current_to_A_distance = distance from current location and A
    AB_distance = distance between A and B (e.g., 211 from table 200)
    Priority_of_A = lowest priority for A from table 100 column 103
(e.g., 1 for "Boston, MA")

-continued

```
Priority_of_B = lowest priority for B (e.g., 1 for Boston, MA from
    FIG. 2, column 103)
A_weather_ = the current reported weather at location A expressed
        as an integer from 1-10, lowest indicating the clearest
weather (e.g., row 215 in FIG. 3)
B_weather_ = the current reported weather location B (1-10)
Current_to_A_traffic = the current reported traffic condition for the
        roads between current location and location A,
        expressed as an integer from 1-10, lowest indicating
        best
AB_traffic = the current reported traffic condition for the roads
    between A and B (1-10)
Then:
    edge weight(location A, location B) =
        (AB_distance * Priority_of_B * B_weather_* AB _traffic
        ) + (Cannot_Reach_A from _current_in_time(
        current_location,
            A,
            A_weather,
            Current_to_A_traffic,
            current_time) * 999)
```

Thus, in the first addend this formula provides a weighting which includes both the time and difficulty in traveling from location A to location B, incorporating the distance, the importance of reaching the destination location B, as well as the slow downs due to weather and traffic. In the second addend, this formula adds a check as to whether location A can be reached in time to match the current itinerary (a time known internally to the function) given the current location and time, as well as the weather near A and the traffic between the current location and A. For example, if A is the intermediary location of Stamford, Conn. and it must be reached by 3:00 PM according to the current itinerary and yet the current time is 2:55 and there are still 50 miles between the current location and Stamford, Conn., then Cannot_Reach_A from _current in time( ) will return 1 (for true, 0 for false), causing the weight of the A B edge to be increased by 999. This in turn will cause the travelling salesman algorithm to avoid the intermediary stop in Stamford, since it would now be too costly.

Then, the travelling salesman algorithm may find a path to visit all the vertices (i.e., all the target locations) with the least amount of cost (i.e., the sum of weights of edges become the least).

Thus, for example, generated from that specified to-do lists, the itinerary may include options of other things (e.g., another "to-do" or task(s)) that could be performed or other people's to-do's added. For example, when planning a trip to a primary destination (e.g., Boston) to perform a primary task, itinerary optimization logic employed may automatically schedule from the obtained user's work to-do list, a secondary task (e.g., attend another meeting, build a dog house), while en route to or after leaving the primary destination. The logic determines all of the other conceivable tasks that could be accomplished by the user on that trip based on one or more to-do lists, constraints, and priorities.

Figure 5:
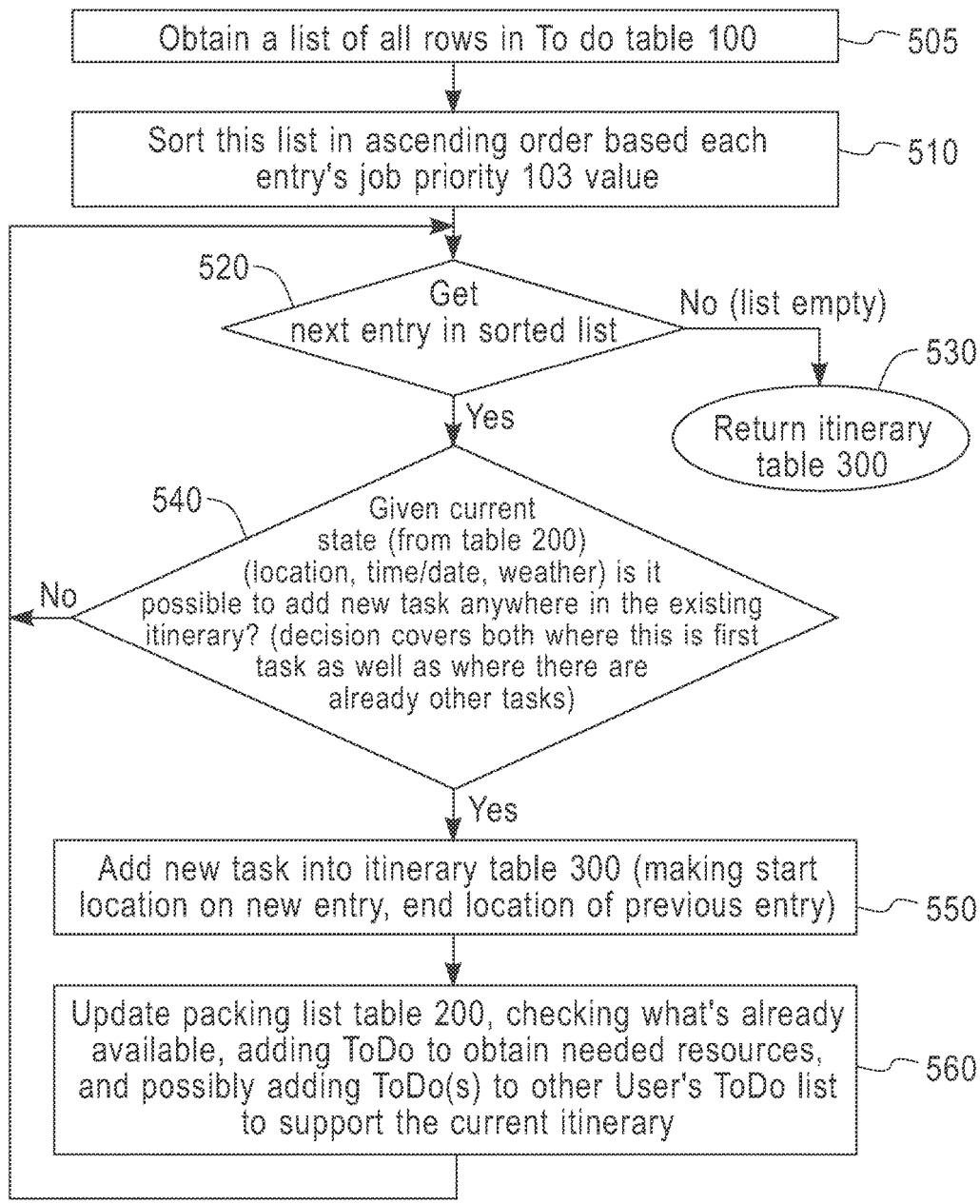
FIG. 5 depicts an iterative procedure implemented by an itinerary generator and optimization logic to perform dynamic updates of user(s) itineraries. These steps are similarly used during a pre-processing step, e.g., to set up feasibility of an itinerary, in the first instance.

FIG. 5 depicts an example method implemented by the itinerary generator optimization logic running in the server or computing device to generate a user's packing list given constraint requirements. FIG. 5 further depicts an example packing list process implemented by the optimization logic including functions for defining to-do resource requirements and creating one or more to-do lists there from for itinerary. FIG. 5 further depicts an iterative process implemented by the itinerary generator and optimization logic to perform dynamic updates of one or more user(s) itineraries. In one embodiment, FIG. 5 depicts an exemplary detailed procedure performed at 57 in FIG. 1. At 505, the database server device running the itinerary generator optimization logic, implemented with travelling salesman algorithm, is configured to retrieve all to-do items specified in the rows in the table 100 shown in FIG. 2. At 510, the database server device is configured to sort this list, e.g., in an ascending order, according to the priority of each task. At 520, the database server or computing device is configured to evaluate whether there exists an entry, (i.e., a row in the table 100 shown in FIG. 2) in the sorted list, which has not been processed. If the sorted list is empty and no entry is available, then the process returns to step 530. If there exists an entry, in the sorted list, to be processed, the database server device may start to process a frontmost entry (i.e., an entry that precedes all other entries), in the sorted list, which has not been processed.

At 540, the database server device is configured to evaluate whether it is possible to add a new task anywhere in a corresponding existing itinerary under the constraints, e.g., a current location, current time, current date, current weather condition, specified in table 200. The database server device performs this evaluation when the processed entry is the first task in the existing itinerary or when there exist other to-dos in the existing itinerary. This evaluation may further employ method steps described in FIG. 6.

Figure 6:
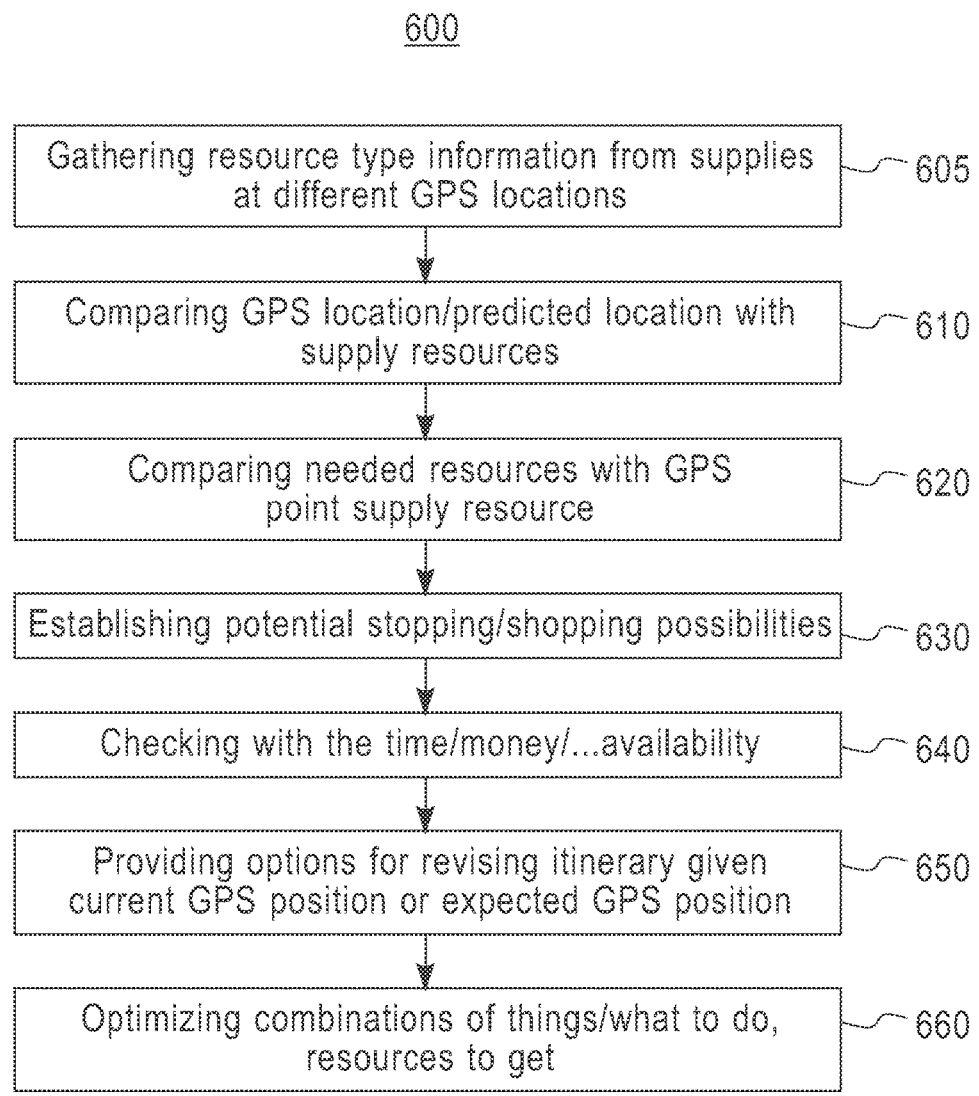
FIG. 6 depicts a further process implemented by the itinerary generator and optimization logic to suggest real-time user actions in the performance of particular tasks and perform real-time dynamic suggestions updates to user(s) tasks, itineraries, etc.

FIG. 6 depicts a further process 600 implemented by the itinerary generator and optimization logic to suggest real-time user actions in the performance of particular tasks and perform real-time dynamic suggestions or updates to user(s) tasks, itineraries, etc. The logic of FIG. 6 further coordinates with manual or web-based agents to obtain locations of any required resource and coordinate availability of that resource to be present for a user or third party to perform the task of a processed itinerary. In one example, the database server device implements web-based or manual agents to obtain information about particular entities, e.g., stores, at particular locations that carry a particular resource, e.g., an item such as a tool, and obtains prices and time availabilities to purchase the resource. Then, using that information, the database server device attempts to add (or update) that user's (or a third party's) itinerary with the task of traveling to another location to obtain the required resource, e.g., before performing the secondary task.

For example, the optimization logic employed may determine a need to obtain a certain additional tool for performing the scheduled task on the user's itinerary that the user may not have brought for the task. Thus, the optimization logic will perform further steps to inform a user of real-time itinerary change to first obtain a particular item (e.g., the tool) before arriving at the target destination to perform the scheduled task. That is, in one embodiment, the optimization logic receives or accesses web-based information accessible on-line (e.g., over a public communications network via a network server) to confirm availability of a particular item at a particular location so that the user can—at or near real-time-purchase ahead of time prior to arriving at a target location as is required to perform the task. That is, given the user's planned itinerary travel route or path, the user's current location and current time, and location of the item (e.g., tool) or participant (e.g., carpenter) required to be available to perform the scheduled task, the optimization logic employed uses additional information from Table 200 and performs a calculation to determine if the itinerary can be amended, e.g., to include the user making a detour from the planned route to first purchase the particular item at the particular location (e.g. a store) prior to arriving at the destination to perform the scheduled task. The employed logic may even generate and inform the user of a new route to include the additional item purchase and ensure compliance with performing the scheduled task on the user's itinerary.

At 605 in FIG. 6, more particularly, the database server device employing the travelling salesman algorithm and the optimization logic (e.g., logic running method steps in FIG. 7) gathers information of required resources from one or more services or on-line websites associated with retail entities, suppliers or stores. The information gathered from the services or on-line websites may provide GPS locations of each supply store. At 610, the database server device receiving knowledge of the user's current GPS location compares the current location (or a future location) of the user against the GPS locations of the retail entities or suppliers or stores. At 620, the database server device evaluates whether each store carries a required resource, e.g., by sending a query (e.g., "hammer") to a server device of each supply store. At 630, the database server device evaluates a possibility to add a one or more further "to-do" item(s) to the user's itinerary, e.g., stopping by a store that carries the required resource and to purchase the item for the user's next task. For example, the database server device evaluates the distance between the current location of the user and the location of that supply store. This distance information may be available, for example, at an electronic map (e.g., Google® map, etc.), commercial GPS device(s), etc. The database server device may obtain this distance information, e.g., by communicating with a commercial GPS device or a server device associated with the electronic map.

At 640, the database server device may further evaluate time duration for the user to travel to that store and a start time of a next task and use the evaluation in updating the itinerary. The database server device may further evaluate the cost to go to that supply chain and the store hour (i.e., availability) of that supply store. Then, the database server device may further evaluate whether the user can go to the supply store before the closing of the supply store and whether the user can arrive on time at a next target location even if the user stops by the supply store, e.g., based on the time duration to take to go to the supply store and time duration to go to the target location from the next supply store. These time durations may be available, for example, at an electronic map service (e.g., Google® map, etc.), commercial GPS device(s), etc.

At 650, the database server device informs the user of one or more options of what to do, e.g., by sending the user to his/her client device, a text or instant message or email. For example, the database server device may send a text to the user to inform the user that (s)he may stop by a particular supply store in order to purchase a resource required for a next task. That particular supply store may be located nearby the current location of the user or along the road to go to a next target location to perform that next task. At 660, the database server device changes the existing itinerary to reflect a change, e.g., stopping by a supply store before going to a next target location. Alternatively, or in addition, the optimization logic implemented with travelling salesman process will optimize combinations of things to do and resources to acquire.

Returning to FIG. 5, at 550, the database server device then may add an entry into the existing itinerary, e.g., to add an entry for stopping by the supply store. In one embodiment, the database server device maintains the itinerary in a form of a table (e.g., table 300 shown in FIG. 4).

Figure 4:
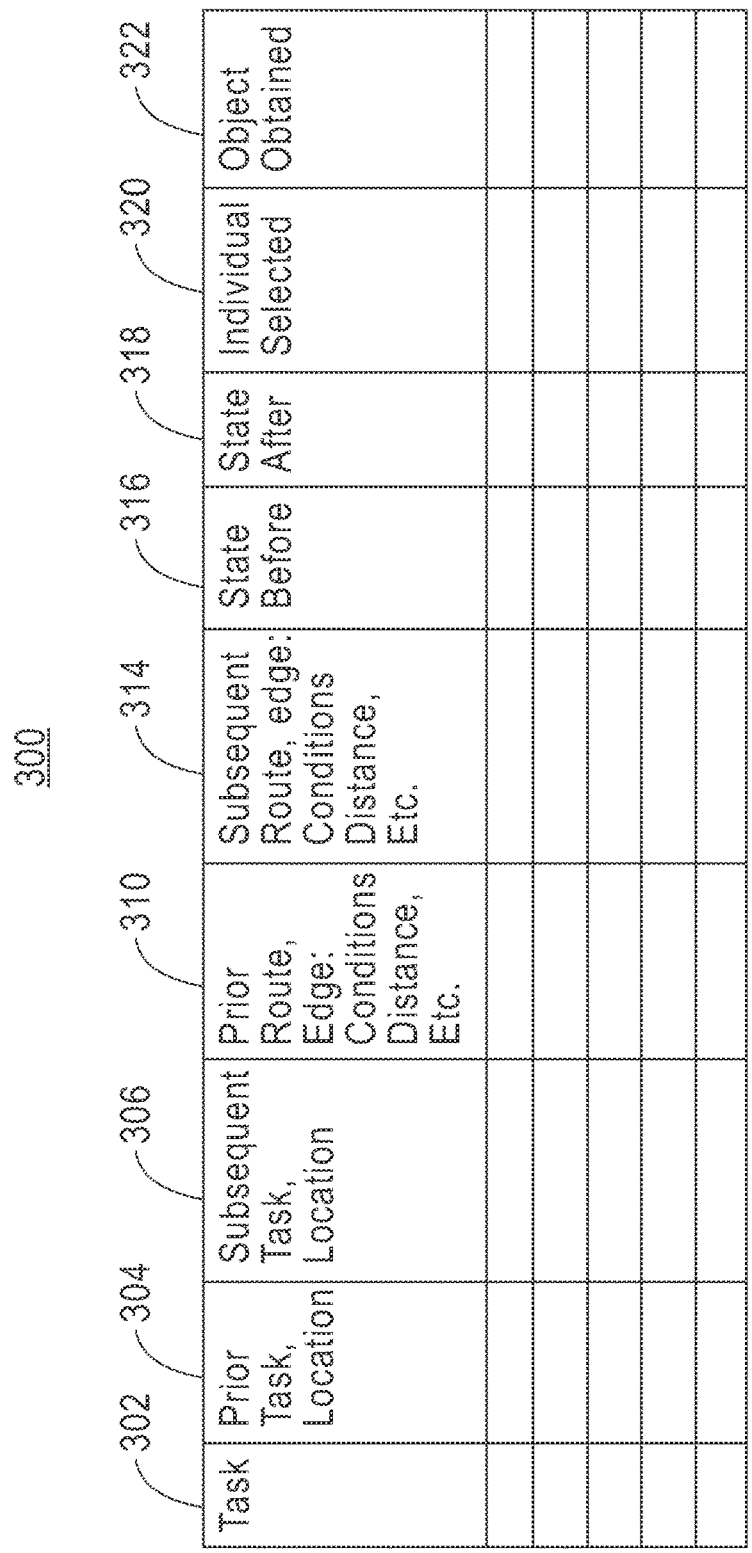
FIG. 4 discloses an output data structure representing an example of an optimized ordered list of tasks (chose optimization criteria) generated by an optimization program running on a computer system.

FIG. 4 discloses an output data structure 300 representing an optimized itinerary that can be presented to a user. Itinerary 300 includes an ordered list of tasks (computed in accordance with optimization criteria in the traveling salesman program operated by the database server device). For example, the user may be provided with, e.g., an automatically updated scheduling program on their home computer or mobile communications device, with information as indicated in an output data structure 300 as a matrix including columns such as: the task in column 302, the prior task location 304 (i.e., a location prior to performing the task), a subsequent destination (i.e., a location after performing the task) in column 306; a distance 310 between the current location of the user and a current target location of the user, a distance 314 between a current target location and a next target location; a pre-existing condition before performing a corresponding task 316 (e.g., a third party must get an item and bring it to perform scheduled task in their itinerary), a subsequent condition after performing a corresponding task in column 318, a third party or other individual selected to perform a corresponding task in column 320; and at least one resource or item required to be present at a corresponding target location for the user to complete a corresponding task column 322. Required resources include, but are not limited to: a person with a particular skill, a person of a particular role, and a tool. To add an entry in the itinerary 300, the database server device may add a row in the table 300, e.g., adding a task, prior location before the task, subsequent destination after the task, etc. The database server device may present the itinerary 300 to the user, e.g., through a display device, etc. The user may receive, e.g., via an email, etc., the itinerary in the form of a user schedule generated by the itinerary generator optimization logic.

Returning to FIG. 5, at 560, the database server device updates the table 200, e.g., to reflect that a required resource is purchased in a supply store. The database server device may further evaluate the table 200 to find out what required resources are already available to a first user. The database server device may attempt to add a to-do to the itinerary in order for the first user to obtain a required resource which is not currently available to the first user. If the first user's itinerary cannot be changed to obtain the required resource, e.g., due to no available store nearby the first user to purchase a required resource, the database server device may attempt to add a to-do to other user's itinerary to let the required resource be available at a next target location of the first user. Then, the control goes back to step 520. At 520, if the database server device determines there exits no entry, in the sorted list, to be processed, the database server device outputs the itinerary 300 shown in FIG. 4 to the corresponding user.

Returning to FIG. 1, at 59, the program's optimization logic makes a determination as to whether a successful itinerary exists, i.e., all or most of the to-do's can be performed given user's real-time or anticipated status (e.g., location), real-time or anticipated weather or traffic conditions, or other real-time dynamics, etc. At 59, if it is determined that a successful itinerary exists, then the process proceeds to 65 where the user attempts to perform a current or next item (i.e., task) in the order specified by the current itinerary. Otherwise, if it is determined that a successful itinerary can not be generated, then the process terminates at 62 and generates an alert to indicate no practicable itinerary can be generated and the reason(s) as to why it can not exist (e.g., no combination of actions will successfully achieve the specified task given user specified target criteria). If, at 59, determined that a successful itinerary does exist, the user attempts to perform the next task in the itinerary at 65, while the system performs monitoring and tracking the current time, the current user location and other environmental factors (e.g., such as traffic) that impact constraints as indicated at 68, FIG. 1. In one aspect, at 65, the database server device may arrange required resources at a target location at (or during) a target location. At 68, the database server may update an weight of each edge (i.e., traffic road(s) between two different target locations), e.g., by taking into account a current time, a current location of the user, a current traffic condition of a road that the user is driving, a current weather condition, and other constraints, etc. The database server device may add or delete vertices (i.e., target locations in the existing itinerary).

During performing of each task, the system conducts real time tracking of the user's status: including, in one embodiment, a current location (in performing the task, or en route when traveling to perform the task(s)) and the current time. As part of an optimization procedure (e.g., method steps described in FIG. 7), determines if the remaining tasks of the itinerary of tasks of that to-do list can be sufficiently performed by the user given the scheduled task itinerary and tracked real-time status variables.

Figure 7:
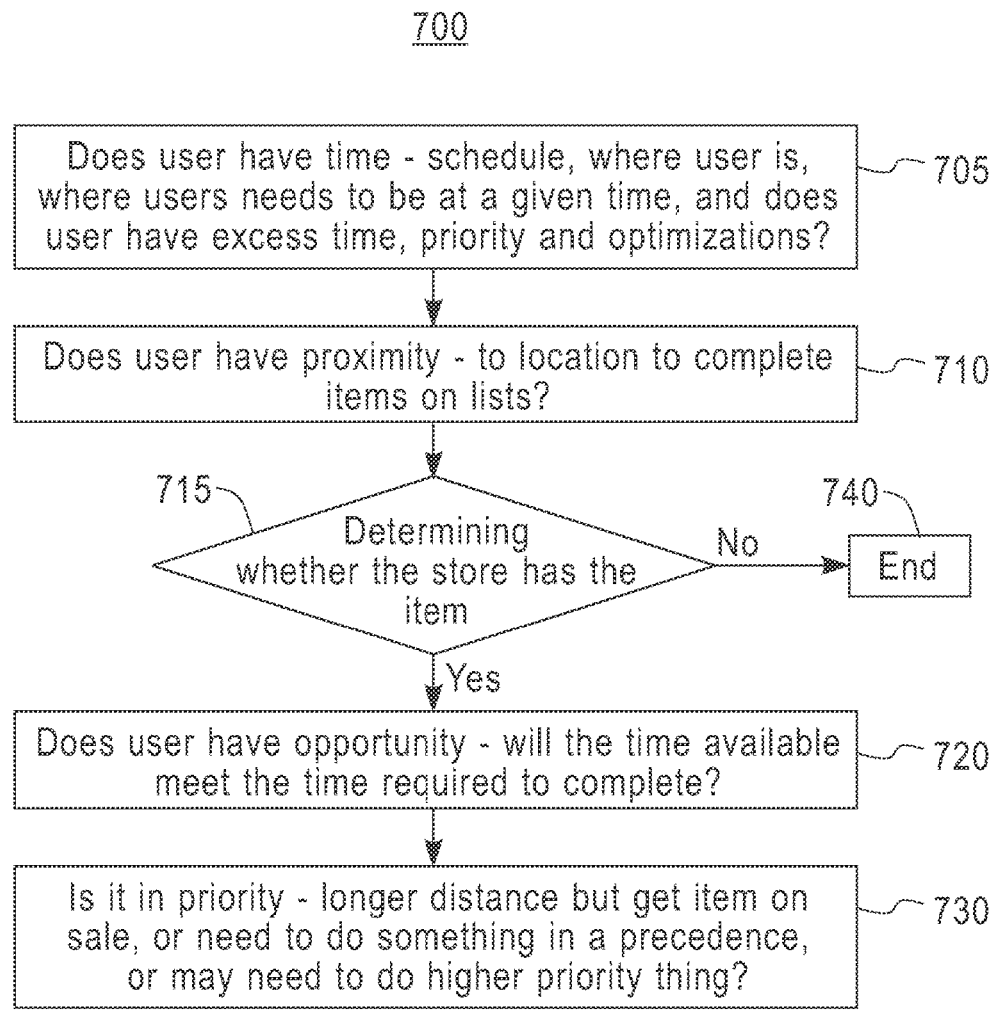
FIG. 7 depicts a further process implemented by a user's mobile communications device, in communication with itinerary generator and optimization logic that provides a user interface to provide or enable real-time user status monitoring; and, FIG. 8 depicts an exemplary hardware configuration of a database server device that runs method steps in FIGS. 1 and 5-7.

FIG. 7 depicts a further process 700 implemented by a user's mobile communications device, in communication with itinerary generator and optimizer logic that provides a user interface to provide or enable real-time user status monitoring. Given a database (e.g., table 100 shown in FIG. 2) of to-do tasks, a packing list (required resources/tools etc.), constraint requirements, based on the priorities indicated for the to-do list tasks, current time or user location via a user device's GPS functionality, the logic employed determines based on priorities what the user can do. As the database server device is conscious of tasks, and required items in performing the task, the database server device may further include functionality for accessing a network server to obtain real-time information regarding availability of the particular item or tool required for performing the scheduled task. For example, the database server device running the optimization logic may determine there may be enough time or extra time to purchase the particular item, and give the option for the user to perform a "side" trip, for example, to obtain additional tool at a store location off-route, and then return back to the scheduled route to eventually arrive at the destination location to perform the scheduled task with the required resource. Alternately, if the optimization logic determines that there would not be enough time to perform the side trip to obtain the resource, which option would not be given to the user.

At 705 in FIG. 7, the database server device is configured to evaluate an existing itinerary, a current location of the user, a target location of an upcoming task, a priority of the upcoming task, and a start time of the upcoming task in order to find out whether the user has extra time until the upcoming task, etc. For example, an electronic map in communication with the database server device determines that the user may arrive at the target location around 11:30 AM. However, the start time of the upcoming task is 2 PM. Then, the database server device determines that the user has two and half hours of extra time until the upcoming task.

At 710-715, the database server device is configured to evaluate a proximity to a location which carries an item needed to upcoming task(s). If there is no proximately located store (e.g., within 5 miles from user's current location) carrying that item, the process ends at 740. Otherwise, if there is at least one proximate store, at 720, the database server device further evaluates whether the user can still arrive at the target location of the upcoming task on time even if the user stops by the location that carries the required resource or item to be purchased, e.g., by calculating time duration needed to go to the location carrying the item, and comparing the start time of the upcoming task and a possible arrival time to the location of upcoming task after stopping by that location. At 730, the database server device is configured to evaluate priorities of upcoming tasks. For example, if the upcoming task has the smallest priority and the user has extra time until the upcoming task, the database server device is configured to suggest that the user can drive a longer distance (e.g., more than a few miles from user's current location) to acquire an item on sale. In another example, if the upcoming task has the smallest priority and the user has extra time, the database server device may be configured to suggest to the user to perform something (e.g., picking an individual needed in another upcoming task with a higher priority) prior to performing the upcoming task with the smallest priority. In another example, if the upcoming task has the smallest priority, the database server device may be configured to inform the user, e.g., by sending a text, an email, an instant message, to perform another task with a higher priority rather than performing the task with the smallest priority.

Returning to FIG. 1, in one embodiment, the process determines at 70, FIG. 1 whether a failure occurred, i.e., whether the current itinerary task can not be completed successfully. If the system employed itinerary updating and optimization logic determines that the current task (or set of tasks) cannot be performed based on the current itinerary and real-time status variables (user location, current time, task or resource provision state constraint, etc.), the process returns to step 57 to attempt to re-calculate (i.e., dynamically update) that user's itinerary which accomplishes the target task, as well as many of the other specified to-do tasks as possible. Furthermore, at 70, the database server device is configured to determine whether there exists a change of a priority of a task in to-do lists or a change of one or more constraints. If there exists a change of a priority of a task in the to-do lists or a change of one or more constraints, the database server device is configured to re-calculate the user's itinerary by returning to step 57. In an alternate embodiment, the database server device is configured to re-calculate the user's itinerary periodically, e.g., every 5 minutes. Alternately, the server device is configured to re-calculate the user's itinerary upon receiving a new constraint, or upon a change in a constraint, e.g., a weather condition change, or upon adding, deleting, or modifying a task, or upon an addition or deletion of a third party(ies) from a to-do list. This re-calculating the user's itinerary may include, but is not limited to: re-running the travelling salesman algorithm with the added vertices, deleted vertices, and/or updated weights of edges. Otherwise, at 70, if it is determined that the current task of that to-do list can be sufficiently performed by the user, the process continues to 72 where it is determined whether the current task is the last task and that the performance of itinerary tasks is completed. If at 72, it is determined that the current task is not the last task of the itinerary, the process returns to 65 for the user to perform processing the next task and initiate system tracking of real-time user status variables (i.e., user locations, current time); otherwise, at 72, if no tasks are left to perform, the process terminates.

Thus, in one embodiment, the traveling salesman optimization logic employed by the database server device dynamically updates, at or near real-time, an itinerary to account for real-time location of the user (e.g., via mobile tracking functionality, effected by real-time satellite Global Positioning System (GPS) (or other location tracking service) in generating the itinerary. In an example, depending upon real-time constraint conditions, e.g., traffic, bad weather that slows down the travel time between node 1, e.g., New York, and node 2, e.g., Boston, as determined by GPS tracking of the user, the system/method dynamically determines whether a change to the itinerary is needed. For example, given the "to-do" list that includes a travel to the second node 2 to perform a primary task 200, given the user's late arrival due to slow vehicle travel time to node 2, for example, the optimization logic employed may determine that the secondary task can not be fully performed for the scheduled time and that only the primary task may be performed. Thus, the user's itinerary will be updated (as needed) to reflect that only the primary task, and not the secondary task, may be performed. As a further example, it may be the case that the method's optimization logic determines that the user's slow vehicle travel time to node 2 prevents even the primary task to be fully performed, and thus, may instruct that the user terminate the trip and return back to that user's originating location, or, instruct the user to travel to another location to perform an alternative task, as dynamically determined.

In one aspect, the optimization logic employed as computer programmed steps, accounts for price, priority, distance, etc. This logic can be run each time there is a change in any record representing Tables 100, 200. In other words, the database server device re-calculates the itinerary anytime there is a change in the priority, the to-do lists, the constraints, or required resources.

In one embodiment, the database server device can be run to create an optimized pre-plan (itinerary). This may include: entering itinerary, consulting an electronic map (e.g., Google® map, etc.), generating routes, looking at "to-do," calculating to perform "to-dos" that can fit in itinerary. This may further include: getting a proposed itinerary-adding/appending other to-do's; prioritizing or modifying in new "to-do" and then re-calculating the proposed itinerary. As a user travelling, if a position of that user changes, a re-calculation is performed based on "to-do" list and the location of the user.

In a further embodiment, the system and method employs the optimization logic intended to enable and inform a user of real-time changes to the itinerary in order to perform a scheduled task of the list. For example, given a current time, and, the scheduled tasks of a user's to-do list, their indicated priorities, the content of any packing or resource list, and the scheduled available time to perform an indicated task.

Thus, in one embodiment, the optimization logic of itinerary generating program further calculates required resources to process the itinerary such as: available person (e.g., third party) with particular skills, or of a particular role, and attempts to arrange for a person with the required characteristics to be available at the target location at (or during) the target time for that task. The optimization logic of itinerary generating program may further update the available person's schedule to be at the target location during the target time for that task, e.g., sending an "appointment" email to the available person and adding the appointment to the available person's electronic calendar.

This includes employing processes for scheduling or planning for an additional task that requires presence of a specific tool(s) to perform a task, for example. The "task" (e.g., conduct a second meeting, for example) may be dynamically added to the to-do list.

Furthermore, there may be automatically generated alerts or communications to inform the user and any additional parties of the additional meeting (i.e., secondary task) generated for that user's itinerary. Thus, the system/method will coordinate the additional person and/or take steps (e.g., notifications) to ensure availability of the required persons/resources to fulfill the secondary task or attend the secondary meeting.

In one embodiment, the optimization logic of itinerary generating program schedules the required resource (e.g., arranging for a required third party, e.g., carpenter to be present when (or before) the user arrives). Thus, the logic initiates coordination with the third parties to be present t a particular task by generating and/or updating each of their individual to-do lists.

In one aspect, the optimization logic further operatively employs processes that change the output data structure of FIG. 4 into a schedule, e.g., an itinerary for the user, or other single or multiple third party users. In a further aspect, the optimization logic further operatively employs processes for aggregating data structures of several individual, several constraints, several projects (with a plurality of tasks) before the optimization. For example, to-do lists (itineraries) from multiple persons may be aggregated in which case the optimization logic would give ordered tasks and select individuals (with skill sets).

For example, the generated itinerary may provide a coordination between multiple to do's where a user may change his/her "role" in order to help another user for a common goal such as obtaining a resource to perform a task, e.g., a carpenter buys a pipe at plumbing store, or a plumber buys 2×4 pipe because she is near a lumber yard. From itinerary (target arrival time, to complete task) if user is ahead of schedule, there will be indicated extra time for which a new to-do is added to the itinerary by modifying the itinerary.

The database server device can be further configured to synchronize itineraries of plural users if a "to-do" involves the plural users. For example, if a user updates an entry in his/her to-do list, his/her client device (e.g., smartphone, etc.) communicates the updated entry to the database server device associated with the to-do list and the itineraries. Then, that database server device updates other one or more itineraries associated with the updated entry in the to-do list.

Figure 8:
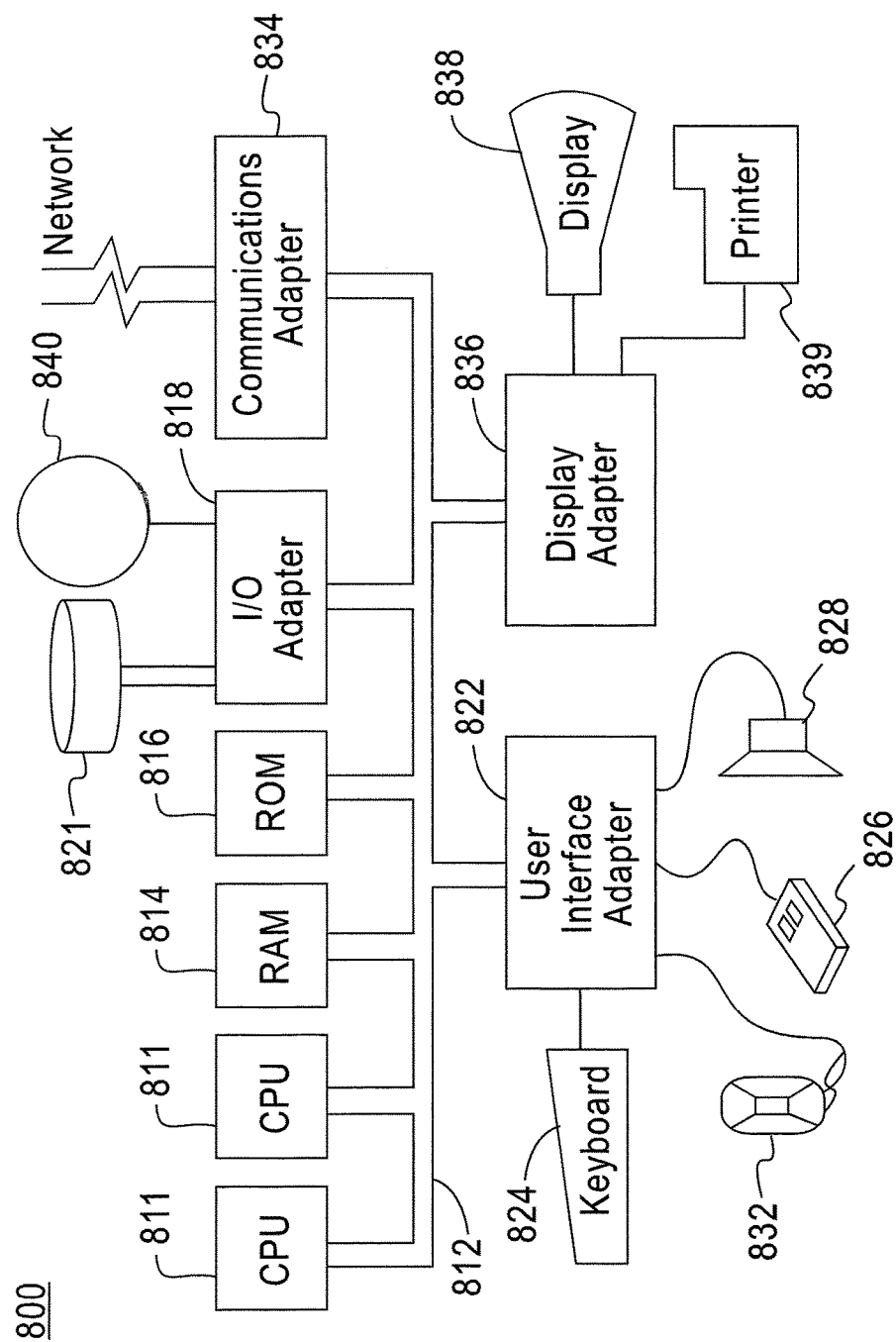

FIG. 8 illustrates an exemplary hardware configuration of the database server device. The hardware configuration preferably has at least one processor or central processing unit (CPU) 811. The CPUs 811 are interconnected via a system bus 812 to a random access memory (RAM) 814, read-only memory (ROM) 816, input/output (I/O) adapter 818 (for connecting peripheral devices such as disk units 821 and tape drives 840 to the bus 812), user interface adapter 822 (for connecting a keyboard 824, mouse 826, speaker 828, microphone 832, and/or other user interface device to the bus 812), a communication adapter 834 for connecting the system 800 to a data processing network, the Internet, an Intranet, a local area network (LAN), etc., and a display adapter 836 for connecting the bus 812 to a display device 838 and/or printer 839 (e.g., a digital printer of the like).

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with a system, apparatus, or device running an instruction.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with a system, apparatus, or device running an instruction.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which run on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more operable instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for generating a dynamically updated itinerary comprising an order of tasks to be performed by a user, the method comprising:
    obtaining a list of to-dos, each to-do list indicating:
        one or more tasks;
        one or more target locations where each said task can be accomplished;
        an expected time duration required to complete each task;
        one or more resources required in completing said task, said one or more resources comprising a person with a particular skill, and an item, said person is different from the user;
        an associated priority indication associated with each said task, said priority indicating an importance of performing the task; and
    determining, by a computing device, one or more constraints for performing each said task;
    automatically generating an itinerary to provide an order for accomplishing each said tasks, said order based on said one or more target locations for performing each said task, and availability of said one or more required resources that must be present at one or more said target locations in order for said user to complete said task at that target location, and said priority indication of each said task;
    employing optimization logic for generating an itinerary output data structure for said user having entries indicating task elements to be performed in said order for accomplishing each said tasks by said user and any required resources, including said person with said particular skill and said item, said optimization logic further employed to generate a further itinerary output data structure for said user indicating an order of other task elements to be performed by said person;

attempting, by said user, to complete said task elements in said order indicated in said user's generated itinerary output data structure, and while performing said tasks:
iteratively tracking, by said computing device, a current location of the user and a current time; and
calculating feasibility of said itinerary associated with said user to complete said tasks in said indicated order; and generating an alert responsive to determining that there is no feasible itinerary for completing said task of said indicated task elements in the order indicated in the generated itinerary output data structure, wherein said computing device including a processor and a memory device, is configured to perform the obtaining of a list of to-dos, the automatically generating of an itinerary, the generating of an itinerary output data structure, the employing of optimization logic, the generating of a respective itinerary output data structure, the calculating of feasibility of the respective itinerary data structure, and the generating of an alert, wherein the automatically generating the itinerary output data structure further comprises:

creating a weighted graph having vertices and edges, each vertex being the target location, and each edge representing a travel path between two target locations, a weight of each edge computed as a function of: a distance AB between a starting location A and a destination location B, a priority associated with the destination location B, a current reported weather condition of the destination location B, a current reported traffic condition of the travel path between the starting location A and the destination location B, and a determination as to whether location A can be reached in time to match a current itinerary given the current location and time;

running a travelling salesman algorithm over the created weighted graph; and indicating one or more paths that visit all vertices in the weighted graph, the one or more paths having a minimum value of a summation of weights of edges on the indicated one or more paths, the one or more paths representing the itinerary.

2. The method as in claim 1, wherein said generating said itinerary output data structure further includes:

calculating, for a task to be performed, an associated status information comprising: a distance between the current location of said user and a target location of the user to perform said task, a distance between the target location and a next target location, a pre-existing condition to perform the task, a subsequent condition after performing the task, at least one other individual besides said user to perform the task, and an object obtained for the task; and populating said itinerary output data structure with said calculated status information associated with said task.

3. The method as in claim 1, further comprising:

attempting, by a user, to run a next task of the one or more tasks in the itinerary output data structure;

tracking, by said computing device, a current location of the user and a current time;

determining, by said computing device, based on the current location of the user and the current time, whether said user can complete the next task in said itinerary; and revising said itinerary with other to-do such that the next task can be performed by said user.

4. The method as in claim 1, further comprising:

receiving, by the computing device, information to satisfy the one or more determined constraints;

pre-processing, by the computing device, the received information; and re-generating, by the computing device, the user's itinerary output data structure based on the pre-processed information.

5. The method as in claim 4, wherein said one or more constraints includes purchasing an item before performing a task of the one or more tasks, and the pre-processing the received information includes steps of:

determining, by the computing device, a distance between a current location of the user and a location that can satisfy a constraint for running said next task in said itinerary output data structure;

determining a price to satisfy the constraint; and determining a time duration needed to satisfy the constraint.

6. The method as in claim 5, further comprising:

determining, from the user, a change of a priority of a task of the one or more tasks in said to-dos list or a change of one or more of said constraints; and re-generating, by the computing device, the itinerary output data structure of task elements anytime there is a change in the priority, the to-dos list, the constraints or the resources.

7. The method as in claim 1, wherein entries of the generated itinerary output data structure accomplishes as many of the one or more to-dos as possible.

8. The method as in claim 1, further comprising:

determining whether an itinerary can be generated in a first instance to provide an order for performing each of said tasks.

9. The method as in claim 1, further comprising:

automatically generating, for association with other users, a respective itinerary to provide an order for performing tasks by that other users; and synchronizing itineraries of the other users if a to-do task involves the other users.

10. The method as in claim 9, wherein the synchronizing includes:

updating an entry in a to-do list;

communicating the updated entry to a database server device associated with the to-do list and the itineraries; and updating, by the database server device, one or more itineraries associated with the updated entry in the to-do list.

11. The method of claim 1, wherein each of the multiple users has a specific skill set, and said generating a respective itinerary output data structure indicating an order of task elements to be performed by each of selected one or more individuals of said multiple users is based on said skill set of said selected one or more individuals.

12. The method of claim 1, wherein a constraint includes a traffic condition of a road the user is travelling, or weather condition, said method further comprising:

generating an itinerary output data structure indicating task elements to be performed in said order for accomplishing each task by said user, determining a change of one or more of said weather or traffic condition constraints; and dynamically re-generating, by the computing device, the itinerary output data structure of elements responsive to a change in the weather or traffic condition constraint changes, said re-calculating reflecting one or more of: a deletion or re-ordering of one or more existing tasks from said itinerary.

13. The method of claim 1, wherein a constraint includes a traffic condition of a road the user is travelling, or weather condition, said method further comprising:

generating an itinerary output data structure indicating task elements to be performed in said order for accomplishing each task by said user, determining a change of one or more of said weather or traffic condition constraints; and dynamically re-generating, by the computing device, the itinerary output data structure of elements responsive to a change in the weather or traffic condition constraint changes, said re-calculating reflecting one or more of: a deletion or re-ordering of one or more existing tasks from said itinerary.

14. A computer-implemented system for generating a dynamically updated itinerary comprising an order of tasks to be performed by a user, the system comprising:

at least one processor;

at least one memory device coupled to the at least one processor, wherein the processor is configured to:

obtain a list of to-dos, each to-do indicating:

one or more tasks;

one or more target locations where each said task can be accomplished;

an expected time duration required to complete each task; and one or more resources required in completing said task, said one or more resources comprising a person with a particular skill, and an item, said person is different from the user;

an associated priority indication associated with each said task, said priority indicating an importance of performing the task;

determine one or more constraints for performing each said task;

automatically generate an itinerary to provide an order for performing each said tasks, said order based on said one or more target locations for performing each said task, and availability of said one or more required resources that must be present at one or more said target locations in order for said user to complete said task at that target location, and said priority indication of each said task;

employ optimization logic to generate an output data structure for said user having entries indicating task elements to be performed in said order for accomplishing each said tasks by said user and any required resources, including said person with said particular skill and said item, said optimization logic further employed to generate a further itinerary output data structure for said user indicating an order of other task elements to be performed by said person;

attempt, by said user, to complete said task elements in said order indicated in said user's generated itinerary output data structure, and while performing said tasks:

iteratively track a current location of the user and a current time; and calculate feasibility of said itinerary associated with said user to complete said tasks in said indicated order; and generate an alert responsive to determining that there is no feasible itinerary for completing said task of said indicated task elements in the order indicated in the generated output data structure, wherein the automatically generate the itinerary output data structure further comprises:

create a weighted graph having vertices and edges, each vertex being the target location, and each edge representing a travel path between two target locations, a weight of each edge computed as a function of: a distance AB between a starting location A and a destination location B, a priority associated with the destination location B, a current reported weather condition of the destination location B, a current reported traffic condition of the travel path between the starting location A and the destination location B, and a determination as to whether location A can be reached in time to match a current itinerary given the current location and time;

run a travelling salesman algorithm over the created weighted graph; and indicate one or more paths that visit all vertices in the weighted graph, the one or more paths having a minimum value of a summation of weights of edges on the indicated one or more paths, the one or more paths representing the itinerary.

15. The system as in claim 14, wherein, in order to generate said itinerary output data structure, the processor is configured to:

calculate, for a task to be performed, an associated status information comprising: a distance between the current location of said user and a target location of the user to perform said task, a distance between the target location and a next target location, a pre-existing condition to perform the task, a subsequent condition after performing the task, at least one other individual besides said user to perform the task, and an object obtained for the task; and populating said itinerary output data structure with said calculated status information associated with said task.

16. The system as in claim 14, wherein the user attempts to run a next task of the one or more tasks in the itinerary output data structure, said processor is further configured to:

track a current location of the user and a current time;

determine, based on the current location of the user and the current time, whether said user can complete the next task in said itinerary; and revise said itinerary with other to-do items such that the next task can be performed by said user.

17. The system of claim 14, wherein each of the multiple users has a specific skill set, and to generate a respective itinerary output data structure indicating an order of task elements to be performed by each of selected one or more individuals of said multiple users is based on said skill set of each of said selected individuals.

18. A computer program product for generating a dynamically updated itinerary comprising an order of tasks to be performed by a user, the computer program product comprising a non-transitory storage medium readable by a processing circuit and storing instructions run by the processing circuit for performing a method, said method comprising:

obtaining a list of to-dos, each to-do indicating:
  one or more tasks;
  one or more target locations where each said task can be accomplished;
  an expected time duration required to complete each task;
  one or more resources required to complete said task, said one or more resources comprising a person with a particular skill, and an item, said person is different from said user;
  an associated priority indication associated with each said task, said priority indicating an importance of performing the task;
determining one or more constraints for performing each said task;
automatically generating an itinerary to provide an order for performing each said tasks, said order based on said one or more target locations for performing each said task, and availability of said one or more required resources that must be present at one or more said target locations in order for said user to complete said task at the target location, and said priority indication of each said task;
employing optimization logic for generating an itinerary output data structure for said user having entries indicating said task elements to be performed in said order for accomplishing each said tasks by said user and any required resources, including said person with said particular skill and said item, said optimization logic further employed to generate a further itinerary output data structure for said user indicating an order of other task elements to be performed by said person;
attempting, by said user, to complete said task elements in said order indicated in said user's generated itinerary output data structure, and while performing said tasks:
  iteratively tracking a current location of the user and a current time; and
  calculating feasibility of said itinerary associated with said user to complete said tasks in said indicated order; and
generating an alert responsive to determining that there is no feasible itinerary for completing said task of said indicated task elements in the order indicated in the generated itinerary output data structure,
wherein the automatically generating the itinerary output data structure further comprises:
creating a weighted graph having vertices and edges, each vertex being the target location, and each edge representing a travel path between two target locations, a weight of each edge computed as a function of: a distance AB between a starting location A and a destination location B, a priority associated with the destination location B, a current reported weather condition of the destination location B, a current reported traffic condition of the travel path between the starting location A and the destination location B, and a determination as to whether location A can be reached in time to match a current itinerary given the current location and time;
running a travelling salesman algorithm over the created weighted graph; and
indicating one or more paths that visit all vertices in the weighted graph, the one or more paths having a minimum value of a summation of weights of edges on the indicated one or more paths, the one or more paths representing the itinerary.

19. The computer program product as in claim 18, wherein the user attempts to run a next task of the one or more tasks in the itinerary output data structure, said processor is further configured to:
  track a current location of the user and a current time;
  determine, based on the current location of the user and the current time, whether said user can complete the next task in said itinerary; and
  revise said itinerary with other to-do items such that the next task can be performed by said user.

20. The computer program product as in claim 18, wherein the processor is configured to provide an associated priority indication associated with each task in said to-do list, said priority indication indicating an importance of performing the task, wherein said generated itinerary output data structure order for performing said tasks accounts for said priority indication.

21. The computer program product as in claim 20, wherein the method further comprises:
  re-generating the user's itinerary output data structure based on the pre-processed information;
  determining one or more constraints for performing a task;
  receiving information to satisfy the one or more determined constraints;
  pre-processing the received information; and
  re-generating the user's itinerary output data structure based on the pre-processed information.

22. The computer program product as in claim 21, wherein the method further comprises:
  determining, from the user, a change of a priority of a task of the one or more tasks in said to-dos list or a change of one or more of said constraints; and
  re-generating the itinerary output data structure anytime there is a change in one or more of the priority, the to-dos list, the constraints or the resources.

23. The computer program product of claim 18, wherein each of the multiple users has a specific skill set, and the generating a respective itinerary output data structure indicating an order of task elements to be performed by each of selected one or more individuals of said multiple users is based on said skill set of each of the selected one or more individuals.

* * * * *